(12) United States Patent
Modigliani et al.

(10) Patent No.: US 7,831,490 B2
(45) Date of Patent: Nov. 9, 2010

(54) ENHANCED SYSTEM FOR ELECTRONIC FUNDS TRANSFER AND ELIMINATION OF THE PAYEE'S NEED FOR ENCRYPTION AND PRIVACY

(75) Inventors: Franco Modigliani, Cambridge, MA (US); Serena Modigliani, legal representative, Cambridge, MA (US); Richard James O'Brien, Lisle, IL (US); Francis M. Vitagliano, Boston, MA (US)

(73) Assignee: Payment Pathways, Inc., Chicago, IL (US)

(*) Notice: Subject to any disclaimer, the term of this patent is extended or adjusted under 35 U.S.C. 154(b) by 1272 days.

(21) Appl. No.: 10/786,023

(22) Filed: Feb. 26, 2004

(65) Prior Publication Data

US 2004/0236681 A1  Nov. 25, 2004

Related U.S. Application Data

(60) Provisional application No. 60/450,754, filed on Feb. 28, 2003.

(51) Int. Cl.
    *G06Q 40/10* (2006.01)
(52) U.S. Cl. .................................................. 705/35
(58) Field of Classification Search .................... 705/42, 705/39, 40, 41, 35
    See application file for complete search history.

(56) References Cited

U.S. PATENT DOCUMENTS

| | | | |
|---|---|---|---|
| 6,173,272 B1 * | 1/2001 | Thomas et al. | 705/42 |
| 6,317,745 B1 * | 11/2001 | Thomas et al. | 707/100 |
| 6,609,113 B1 * | 8/2003 | O'Leary et al. | 705/39 |
| 7,158,955 B2 * | 1/2007 | Diveley et al. | 705/74 |
| 7,165,052 B2 * | 1/2007 | Diveley et al. | 705/74 |
| 7,225,156 B2 * | 5/2007 | Fisher et al. | 705/50 |
| 2002/0077978 A1 | 6/2002 | O'Leary et al. | 705/40 |

OTHER PUBLICATIONS

No Author, Directory Management Leader NetVision, Inc., Introduces Affordable Software-Leasing Program (PR Newswire, Nov. 22, 1999).*

"Technology Journal—Check It Out—The Web is suddenly crowded with online-payment services; Here's how they compare", Will Morton, Asian Wall Street Journal, New York, NY; Dec. 10, 2001, p. T.8.

"Pay it on the Net", Brice Scheschuk, CMA Management, Hamilton, Jun. 2001, vol. 75, Issue. 4; p. 30-34.

"Credit-Card Firms Get Into Web Game—Online Payment Initiatives Are a Must", Sapsford et al., Asian Wall Street Journal, New York, NY., Apr. 3, 2001, p. N.1.

"Still Waiting for the E-Mail and Faxes to Start Coming in?", Brooks, Andree, New York Times, (Late Edition (East Coast)), New York, NY., Dec. 19, 1996, p. C.7.

* cited by examiner

*Primary Examiner*—James P Trammell
*Assistant Examiner*—Abdul Basit
(74) *Attorney, Agent, or Firm*—Troutman Sanders LLP

(57) ABSTRACT

The present invention relates to a central (root) directory and/or network of directories to linked credit accounts. Each linked credit account accepts, or is responsive to incoming payments or credits, without the need for access numbers, account numbers, routing numbers, or the like. The payment/deposit account may be set up as a deposit only account (e.g., it cannot pay out or be debited in the traditional sense). In this way, it can be effective in eliminating many of the security requirements of a traditional financial account.

13 Claims, 4 Drawing Sheets

ENHANCED SYSTEM FOR ELECTRONIC FUNDS TRANSFER AND ELIMINATION OF THE PAYEE'S NEED FOR ENCRYPTION AND PRIVACY

CROSS-REFERENCE TO RELATED APPLICATIONS

This application claims the benefit of provisional application No. 60/450,754, filed Feb. 28, 2003, the entire contents of which are incorporated herein by reference.

TECHNICAL FIELD OF THE INVENTION

This invention relates to a system and method of making financial transactions, and more particularly, a system and method of making deposits and payments without the need for security or encryption devices.

BACKGROUND OF THE INVENTION

In today's fast paced computer dependent world, people make purchases, payments, deposits, and other financial transactions without the exchange of traditional money, checks, or even the simple act of handing a teller a credit or debit card. Many transactions made by individuals today are done over the telephone or Internet. Such public forums and systems require security measures, which are often tedious, inconvenient, and can cause long delays in what are otherwise simple transactions. Payments for goods and services generally require a transfer of funds by way of cash, check, money order, or credit card. While merchants and restaurants accept credit cards, most people do not. Most people making small financial transactions do not have the luxury of a personal credit card machine that can record transactions and conduct a quick credit check, thereby limiting them to accept cash or checks. Yet, with a check, there is the risk of being kited. Additionally, most individuals must make a special trip to the bank in order to make a simple deposit of cash and/or checks. A "short" trip to the bank can often waste hours.

The time delays and the expense of relatively simple transactions can be a huge inconvenience given today's harried lifestyles. Most people work regular nine-to-five jobs, the same hours as banks, with little free time during the weekday. This causes people to waste what precious time they have on the weekends. Weekends are often spent food shopping, clothes shopping, house cleaning, and maintaining and repairing house and car, not to mention meeting the obligations of family and kids. With so many errands to run, the weekend can be even more hectic than the workweek.

Therefore, there remains a need in the art for an easy and convenient system and method for making and/or receiving payments and credits, without the need for security or encryption devices.

SUMMARY OF THE INVENTION

The present invention provides a system for conducting financial transactions comprising an account, residing at a financial institution, capable of accepting deposits given a publicly available Unique Identifier of the account holder. One aspect of the present invention provides a method of conducting a financial transaction by providing a payer with a publicly accessible Unique Identifier, directing the payer to an account, associated with the Unique Identifier, and/or financial institution where the account resides, and completing the financial transaction by depositing funds into the account.

In another aspect of the present invention, a payee can conduct a transaction for goods or services with a payer by giving the payer the client-recipient's Unique Identifier. The payer simply contacts a Central Directory and/or Processor and makes the transfer of funds by credit card, by mailing a check to the Central Directory/Processor (CD/P), or by authorizing the Central Directory/Processor to debit his bank account. All the information that the payer needs, is the payee's name and address, or the payee's Unique Identifier. Some examples of Unique Identifiers are name and/or address, phone number, e-mail address, ENUM registry address, etc.; it can be practically anything.

Transactions received by the Processor, via the Internet, other electronic means, mail, or even hand delivery, are screened to determine if the transaction is a debit to the payer's account or an instruction to credit (push a payment to) the payee's account. If the transaction is identified as a credit, then acceptance by the financial institution ensues and the credit is made to the payee's account. If the transaction is a debit to the payer's account, then the usual security operations are required such as encryption, PIN codes, and the like.

It is also possible for the database processors to maintain the name of linked financial institutions for each name and address, so that the payer need only know the payee's Unique Identifier. This would eliminate the need for the payer to know the payee's financial institution. Thus the payer could send a credit to the payee knowing only what is normally on a payee's business card. This would enable the payer to transmit the information for the payment or credit to the payee through the CD/P, which identifies the transaction as a credit and forwards it to the payee's bank where a Linked Credit Account resides. Since the Linked Credit Account (LCA) accepts only deposits, clients will not fear giving out their Unique Identifier. One form of unique identifier implementation of this method whereby a trusted third party payment processing network functions to mask the true bank account information is referenced in prior art of U.S. Pat. Nos. 6,317,745 and 6,173,272. However, these implementations are restricted to banks that are prior member institutions of the "trusted third party" payment network. Thus the prior art approaches do not anticipate a public directory of various forms of Linked Credit Accounts, regardless of payment form and payment network affiliation.

Some unique and valuable characteristics of the present invention include:
1. Using only publicly known information about the payee to accept deposits and payments, and implement fund transfers between parties.
2. Sending transaction confirmations to the payer and payee using electronic, traditional mail, courier, or the like.
3. Allowing payers to use the Internet, telephone, and other electronic-based transactions for payments knowing only the payee's name, name and address, or other Unique Identifier, and possibly the financial institution where the LCA resides.
4. Allowing payees to maintain multiple LCAs by either having different addresses, Unique Identifiers, or having LCAs at more than one financial institution.

BRIEF DESCRIPTION OF THE DRAWINGS

To facilitate an understanding of the characteristics, structure and operation of the invention, preferred features of the invention are described in the accompanying discussion, wherein similar reference characters denote similar elements throughout the several views or embodiments, and wherein.

DETAILED DESCRIPTION OF THE PREFERRED EMBODIMENTS

Figure 1:
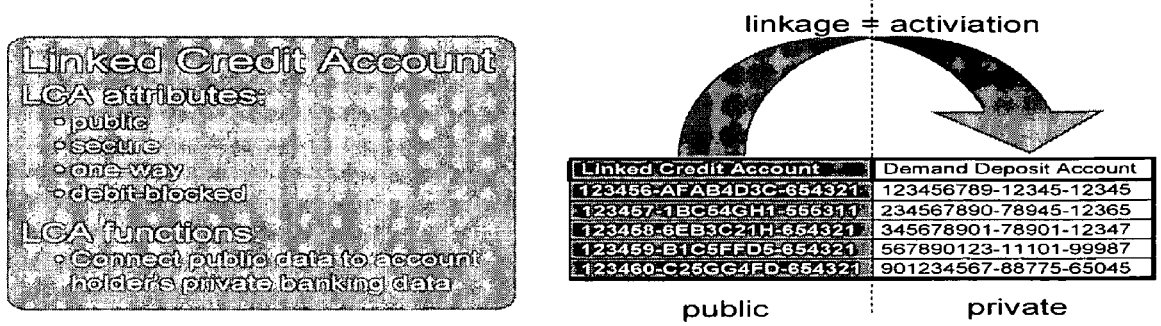
FIG. 1 is a graphical representation of an illustrative relationship between a Linked Credit Account and a Demand Deposit Account according to the present invention.

The present invention relates to establishing and using a linked credit account (LCA). In a preferred embodiment of the present invention, a central directory and/or processor is established and made public. When a payer wishes to send a payment to a payee, the payer need give only the payee's unique identifier, which the central directory/processor translates into the client's linked credit account number and/or location of the appropriate financial institution. The central directory can act essentially as the definitive root directory to all forms of LCAs. According to one embodiment, and as shown in FIG. 1, directory listings can become activated and public only after banks or other payment destination entities complete a formal enrollment process, which registers account and linkage information. The banks or other payment entities are responsible for verifying the true identity of the account holders. Conformance to enrollment rules by all banks and third party payment processing institutions insures that the linkage information is accurate and thus can be trusted by all parties.

The processor can be a bank or other third party payment processor entity. The processor may perform the enrollment function and/or payment processing functions for its clients. The processor synchronizes its sub-directory containing the activated account information of its domain with the root directory. The processor may choose in return to obtain authenticated and updated enrollment rolls from the root directory. This preferred implementation enables the central directory to synchronize LCA information to an entire network of directories which may or may not be publicly accessible. This is valuable because the neutral positioning of the central directory in the marketplace bridges the major automated clearinghouse networks by listing all forms of LCAs, without necessarily listing all forms of unique identifiers, such as other bank owned customer data. This neutrality enables adoption in the marketplace.

The processor can act as a doorway that allows funds to travel in only one direction, thereby creating a one-way account. Thus, no one other than the client can withdraw funds from the linked credit account. Additionally, the payer need never even contact the payee/client in making a deposit. Furthermore, even if the payer knows only the individual's last name and perhaps a general location, such as city of residence or employer's name, the central directory/processor may be able to identify the payee by a process of elimination.

Figure 2:
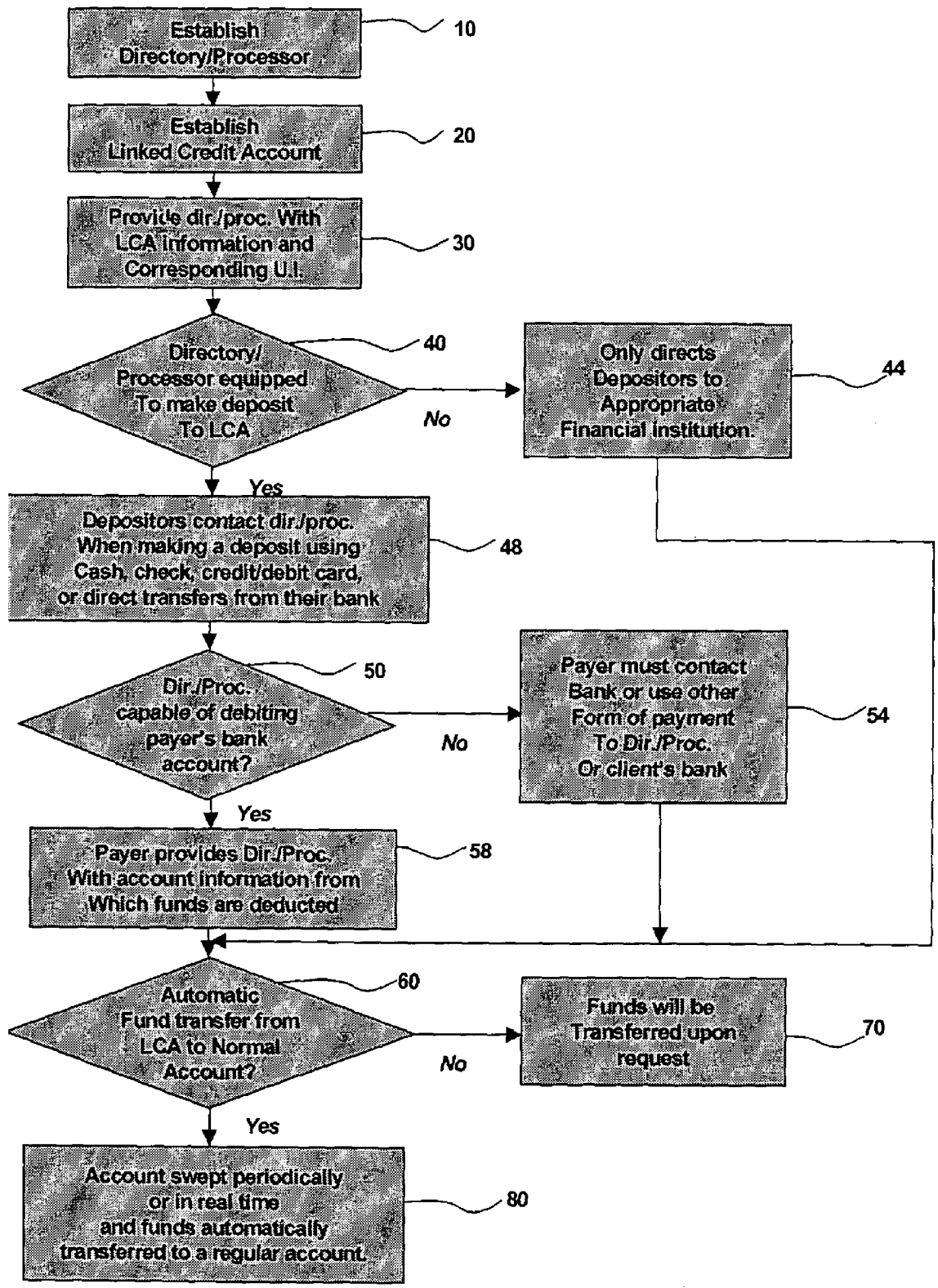
FIG. 2 is a flowchart of an illustrative method of establishing the Linked Credit Account according to the present invention.

As shown in FIG. 2, a central directory/processor 10 may be established as purely a directory for routing payers to the appropriate financial institution where the linked credit account resides. As a directory, the central directory/processor can, in effect, act in the same manner as a telephone directory. However, instead of providing a payee's telephone number, the central directory/processor can provide the name and/or location of the financial institution in which the payee's linked credit account resides, and possibly the actual LCA number.

The central directory/processor may, additionally or alternatively, act as a processor of financial transactions. Specifically, the central directory/processor may be established to receive funds, in the form of cash, checks, credit card payments, and/or other known forms, and transfer the funds to the linked credit account. In this way, a payer is able to send payee(s) money while retaining total anonymity, even from the financial institution where the linked credit account resides.

The next, or simultaneous step, is establishing a linked credit account 20 with a financial institution. If desired, the central directory/processor can be set up as a financial institution. Subscribers/clients/payees can simply provide the central directory/processor with the necessary public and private information 30. For example, public information could include the client's name, nickname, title, address, etc., while private information could include the linked credit account number and location. If the central directory/processor is set up as purely a directory 44, there is no need for it to have any private information, with the exception of the name of the financial institution in which the linked credit account resides. While most people are normally reluctant to give out the name of a financial institution in which they keep accounts, this would not be the case with a linked credit account. Nevertheless, if the central directory/processor is equipped to make deposits to the appropriate linked credit account 40, the payer can simply contact the central directory/processor and transfer the desired amount using any of the aforementioned methods 48.

Additionally, the central directory/processor may even be set up to be capable of debiting a payer's bank account, when provided with the account number 58. If the central directory/processor is not set up to debit the payer's bank account 50, then the payer must either contact his/her bank to make the transaction, or use another form, such as cash, check, money order, wire transfer, credit card payment, or the like 54.

Regardless of the manner in which funds are deposited, the linked credit account may also be set up for funds to be transferred to a normal or standard type account 60. Two basic ways in which to accomplish the transfers will be described herein, however others are possible. A quick and convenient method would be to set up the linked credit account so as to provide for automatic transfers 80. These automatic transfers can be made periodically, or in real time. Naturally, it would be convenient for there to be a regular account in the same financial institution in which the linked credit account resides. However, the funds can be transferred to an account residing in another bank or even another country. An alternative would be for the transfers to be made upon request of the client of the linked credit account, or simply by mailing a check to the client's designated address.

Figure 3:
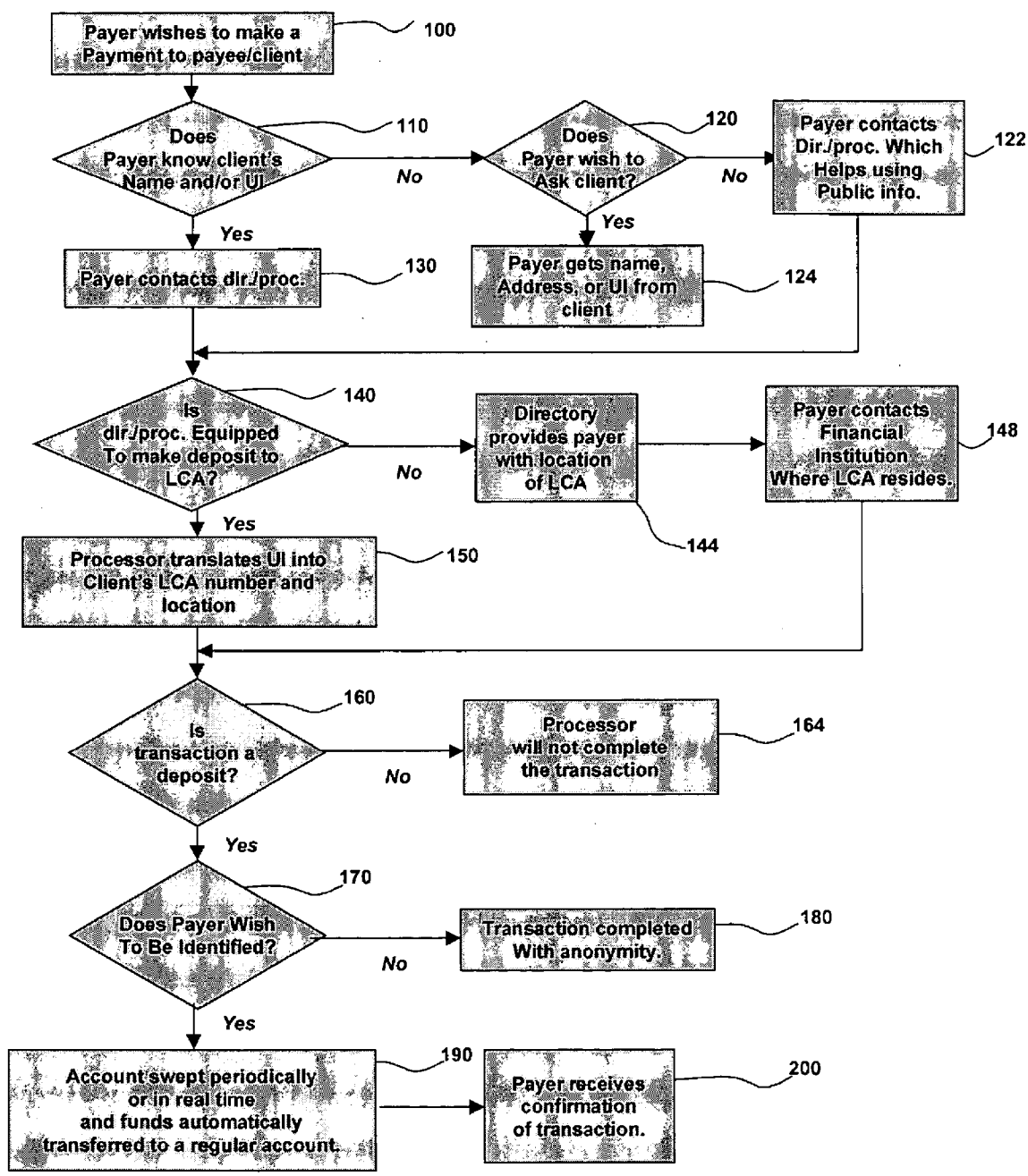
FIG. 3 is a flowchart of an illustrative method of using the Central Directory Processor and Linked Credit Account according to the present invention.
Figure 4:
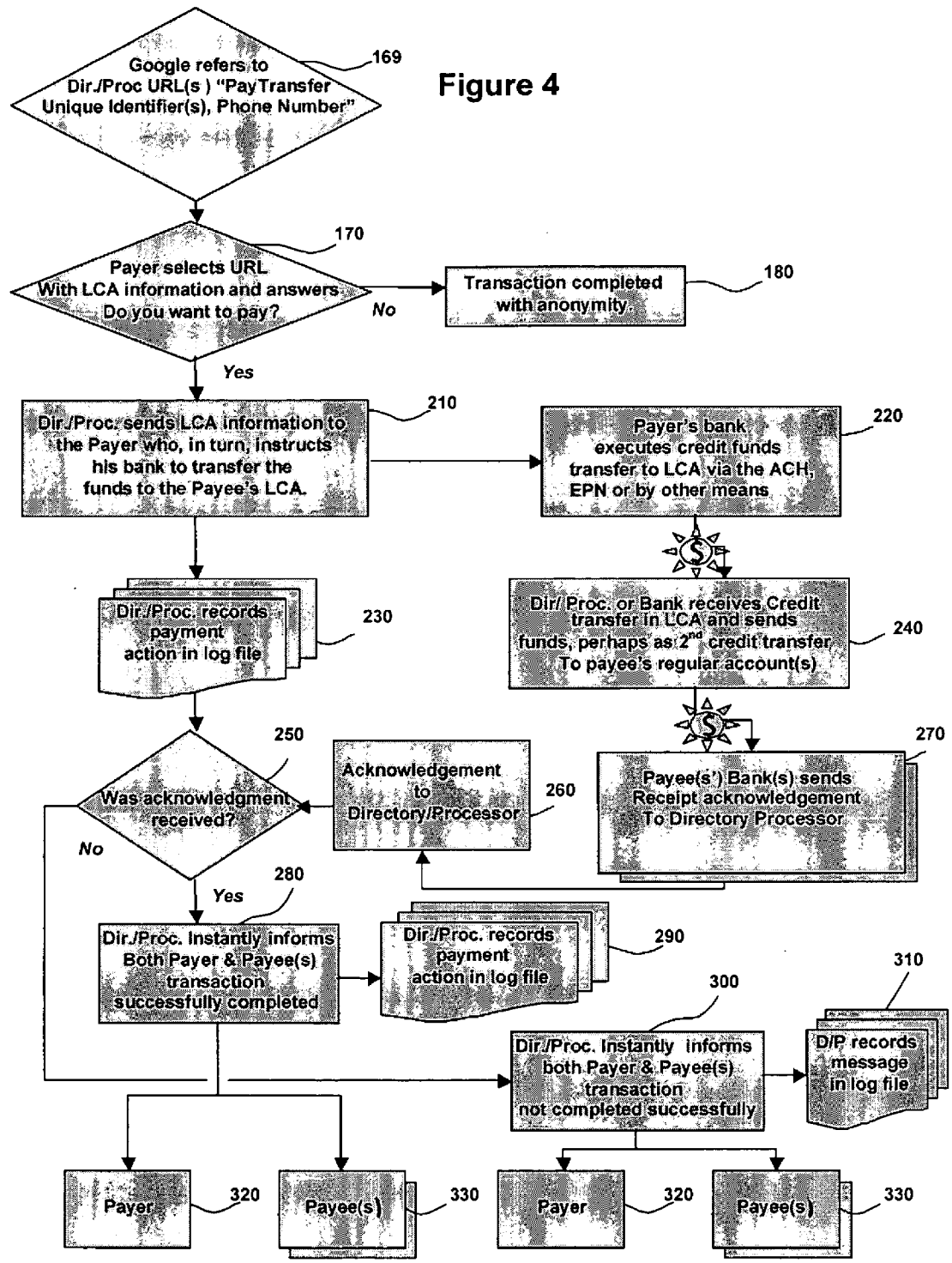
FIG. 4 is a flowchart of an illustrative method of using the Internet's Search Engines and Domain Name System (DNS) to access and use the nearest relevant Central Directory Processor to process and accelerate a credit electronic funds transfer payment and obtain a real-time validation that payments are in irrevocable transit to a Linked Credit Account.

FIG. 3 shows an illustrative process for making a deposit into a linked credit account in the above-mentioned system. If a payer wishes to make a payment to a payee/client of a linked credit account 100, all that he/she needs to know is the client's unique identifier 110. The unique identifier can be anything that associates a particular linked credit account with the client, such as a nickname, address, e-mail address, license plate number, title, or the like. In this way, a client may have several linked credit accounts. Furthermore, the information necessary for associating a client with a linked credit account is preferably public information. The easier it is to locate a client's linked credit account, the easier it will be for the client to receive payments, gifts, etc. Since the linked credit account can be set up as a one-way account, there is no fear on the part of the client that someone will take funds out of it. A further discussion of the safeguards of the linked credit account will be discussed shortly. Once the payer has the unique identifier, the next step is to contact the central directory/processor.

Even if the payer does not know a client's name or unique identifier 110, the payer may still be able to locate the appropriate linked credit account and/or the financial institution where it resides. For example, if the payer knows only that the client's last name is Smith, there are several ways in which to locate the linked credit account. The easiest way would be to ask the client 124. However, if the payer wishes to remain anonymous 120, the payer can contact the central directory/processor without notifying the client 122. Even if the central directory/processor is set up only as a directory, there may be enough data associated with the linked credit account to locate it by using the process of elimination. As an example, take the name Smith, which is a very common name. Other information available to the payer may be helpful in narrowing the list down. Information such as general location (e.g., state, city, town, neighborhood), or simply the street at which the client resides or does business, may be sufficient to locate the appropriate linked credit account.

Once the payer has contacted the central directory/processor 122, 130 and the appropriate linked credit account has been located, it is time to make the deposit. If the central directory/processor is established only as a directory 140, then the central directory/processor provides the payer with the name of the financial institution where the linked credit account resides 144 and the LCA number. The payer then contacts his financial institution 148 and conducts the transfer directly. However, if the central directory/processor is established as a processor capable of depositing funds directly to the linked credit account 140, then the central directory/processor translates the unique identifier into the client's linked credit account number and location 150, and without divulging this information, conducts the transfer. In this way, it is possible to keep the location of the linked credit account anonymous, as well as the identity of the payer.

Regardless of whether the transaction is conducted through the central directory/processor or the financial institution acting as a processor, only deposits may be made by anyone other than the owner of the linked credit account. If the transaction by the payer is not a deposit 160, it will not be completed 164. However, once the transaction is recognized as a deposit, the payer may be asked whether he or she wishes to be identified 170. If the answer is no, the transaction is completed with anonymity 180. Otherwise, the transaction is initiated and completed and the owner of the linked credit account is furnished with the information provided by the payer 190. In either case, the payer and payee receive confirmations of the transaction 200 according to their respective notification preferences which are registered in the directory during the enrollment process. The confirmations can be either in the form of e-mail, letter, secure on-line pop-ups, on-line journal or transaction record entry, etc., thereby providing a dependable method of keeping track of payments. Each time a deposit is initiated and completed, the central directory/processor or the financial institution would provide a copy or e-mail of the transaction to the appropriate parties.

The central directory/processor can also be set up to aggregate transactions to determine if the net effect is a credit to the client/payee. An example might be where a client returns an item for credit and at the same time at the same merchant, purchases an item with a net effect of the two transactions resulting in credit. Thus, the central directory/processor would aggregate the two transactions and pass along both transactions possibly linking them electronically.

Another use of this invention would be for clients/subscribers that receive a large number of payments such as utility and telephone companies. The payer would be able to order the payment to be debited from his/her bank account, credit card account or other asset-based account and have the payment transferred or credited to the company, simply by providing the company's name or other publicly available unique identifier. The payer's financial institution would be able to do the rest. The financial institution would check the appropriate central directory/processor for the company's name and LCA number and make the transfer. The central directory/processor identifies the company's/client's transaction as a credit then matches the name, or other unique identifier, to the appropriate financial institution and linked credit account number. Once the transaction is completed, a verification of the transaction is sent to all the parties involved.

The present invention can allow individuals to use their usual and customary business cards or calling cards as a definitive address to receive payments. By using information about the client that is public and also identifies the client as a unique entity, the central/directory processor can process credits to the client's linked credit account without the need for any security or encryption methods. By extension, future ENUM directories are beginning to be established throughout the world to list telephone numbers as public web addresses. The present invention of a directory to linked credit accounts will permit web-enabled payment services to process credits to clients' linked credit accounts internationally without the need for any security or encryption methods.

This invention allows payers to easily switch between bill payment service providers, or easily and simultaneously use multiple bill payment service providers, such as the Internet-based bill paying service providers. The list of payees and their addresses, or other unique identifiers can be kept on the payer's computer or other database processor, and be used to obtain a validated linked credit account number from the central directory each time the payer initiates a payment. The bill payment service provider does not need to know the payee's bank account number or other receiving account. The bill payment service provider need know only the client's unique identifier and the central directory/processor of the present invention can link that information to the appropriate linked credit account.

Another aspect of the present invention is to use a client's telephone number, so that funds can be credited to his/her telephone or cell phone account, or linked credit account. This would allow a payer to immediately pay a payee by telephone or cell phone, and the payee can get an instant confirmation from his/her phone. In this way, small financial transfers can be made instantaneously without the need for cash. An example of the possibilities is a yard sale or flea market where the seller cannot accept credit cards, but does have a linked credit account. The buyer can simply use a cell phone to transfer the funds and the seller/client would be able to confirm by phone. The same can be done with private automobile sales, where sellers prefer to be paid in cash for fear of being kited. In order to avoid the inherent risks of carrying thousands of dollars, the purchase can be made with a simple phone call, if the seller has a linked credit account.

Similarly, the present invention can also be used in conjunction with credit card, debit card, ATM card, or similar systems and payment networks. As an example, the card-holder can have a linked credit account used in conjunction with a credit card, debit card or private card account. This would transform a credit card account into a deposit account capable of accepting deposits anywhere the card is accepted, even worldwide. This use is a great benefit to people that conduct business across state and national borders.

Furthermore, the present invention can be used to split payments made by a single payer party among two or more payee parties. As an example, contractors and their supply-chain sub-contractor suppliers can be simultaneously paid by pre-arranged agreement according to each payee's role in the creation of the value of the goods and/or service provider in the business transaction.

An example of an optimum design utilizing the prior art of highly scalable and distributed database architectures is the Internet's Domain Name Service (DNS) and the Internet's public search engines. The present invention may utilize a search engine 169 to scan the public DNS (and/or enhanced Private DNS Services) to locate the relevant central directory/processor. The central directory/processor would locate and present the linked credit account information to the payer 170 and ask if he wants to pay. The payer would then receive instructions from the central directory/processor about one or several methods to initiate a credit electronic funds transfer 210 and record a payment pending action in the log file for the LCA 230. The payer can engage his bank payment process immediately 220 or disengage and later send funds (or not) anonymously 180 via the ACH or some other means to the linked credit account at the central directory/processor. Upon receiving the credit electronic funds transfer 220, the central directory/processor would immediately initiate a second internal funds transfer to the payee's regular bank account 240. This function of sweeping the funds from the linked credit account to the payee's regular bank account may have the effect of accelerating the payment to the payee by as much as twenty-four hours compared to using the more common debit electronic funds transfer method of the ACH. Upon receiving positive receipt acknowledgment 260 via various means from the payee's bank 270, the central directory/processor instantly notifies 250 the payer and payee that the transaction has completed successfully. A characteristic of the Internet's DNS infrastructure is the ability to utilize "Anycast technology" from UltraDNS, which simultaneously synchronizes DNS Directory entries for a vast number of URLs of central directory/processors. It is likely that the central directory/processors will be geographically dispersed and associated with payees in various ways. These CD/Ps could be but are not limited to corporate entities (such as Affiliated Network Services, LLC) serving industry sectors in real-time (such as the healthcare industry) and/or individuals (such as healthcare claimants). These CD/Ps may even be located in different parts of the world.

This method may be useful to simultaneously notify in real-time, payers 320 and payees 330 of successful payment initiation and completion steps 280 or unsuccessful payment initiation and completion 300 of transactions across vast distances. The real-time and simultaneous recording and transmission of messages in a log file 310 is an important characteristic of the enhanced design of the present invention. For example, when international payments are made to obtain certified and settled ownership of a product or commodity with real-time, certified notification, the product or commodity can be subsequently and/or promptly re-sold to another party anywhere in the world. By recording and informing of the events of transmission of receipt acknowledgement messages 280, 300, the central directory/processor becomes a source of truthful information about every movement of real money into a linked credit account and its real-time disposition into the true owner's account. By simultaneously and in real-time notifying the payer and payee of a payment's final completion and receipt acknowledgment, the opportunity for banking institutions to hold real money (a.k.a. "float") in the middle of the payment process is reduced. This means that payers can hold on to their money longer and/or payees can receive their money faster.

When funds are transferred between entities in two different countries with dissimilar currencies, currency settlement takes place in the country of destination. This invention enables remittance and status information about the transnational movement of funds through one or several one-way LCA accounts to be trusted and reliably delivered to trading partners and their designated agents in a timely and predictable fashion. Value added services such as new methods for assessing risks for currency exchange rates and new risk abatement techniques can be instituted based on this information capture. This means that the present day costs of sending finds to other countries can be lowered for one or both parties in a transaction.

The aforementioned example illustrates that the present invention is a system that is easily integrated into existing systems, thus able to accelerate widespread adoption due to its evolutionary implementation path.

Another advantage of utilizing the public Internet and/or public telephone infrastructure to notify the payer and payee of a successful or unsuccessful transaction completion is to eliminate the unnecessary, costly, and time consuming middle step of the payer's bank or payee's bank relaying such information. Often, this information requires the individual consumer or small business to query either the payer or payee bank or both periodically throughout the week to learn if payment has arrived. Often, automated systems for electronic response such as touch-tone data entry and synthesized speech response methodologies do not accurately reflect the actual payment status. This is especially true whenever such systems generate paper checks (debits) in domestic transactions or in developing countries.

A significantly better alternative, active DNS directories are updated in real-time. A new web page "view" (and its corresponding DNS entry) of a single payment transaction (database listing) in the central directory/processor can be constructed to provide up-to-the-minute "views" of the central directory/processor(s)' payment status information in a log file listing of completed payments 290. This status information (or a subset of it) is deemed to be public information by mutual consent of both payer and payee transaction parties. Status information (or a subset of it) can be observed nearly simultaneously from different parts of the world. In this fashion, the DNS infrastructure of the Internet can be used to accomplish a "poor-man's" electronic clearing network for developing nations, and enable the emergence of computerized trading systems without any more sophistication than simply using the most basic bank EFT functions.

Banks may choose to utilize the FED ACH payment network or EPN network to transmit enrollment data to the central directory. Because the present invention can be integrated within the Automated Clearing House of the Federal Reserve Bank of the United States 260 (or equivalent electronic clearing and/or settlement systems such as the Electronic Payment Network, and ATM networks) and/or corresponding institutions in other countries (CHIPS, SWIFT international inter-bank exchange networks), the information reflected in the central directory/processor can always be trusted by banks to be accurate, complete and current.

The foregoing descriptions are meant to be illustrative and not limiting. Various changes, modifications, and additions may become apparent to the skilled artisan based upon the disclosure in this specification, and such are meant to be within the scope and spirit of the invention as defined by the appended claims.

What is claimed:

1. A computer-implemented method for conducting financial transactions over a network of payment networks, comprising:

associating a unique identifier with one or more payment addresses of an account and a holder of said account, said account residing at a financial institution and said associated payment addresses of said account configured to allow withdrawals by said account holder only and to allow a plurality of deposits to be made at different times;

making said unique identifier available to users of an Internet portal or search engine without requiring a password or log-in;

receiving data over said network of payment networks identifying one or more non-repudiable deposits to be made to said account;

assigning said one or more non-repudiable deposits to said account using any one of said payment addresses associated with said unique identifier; and notifying on a real-time basis a depositor of said deposit of said assigning of said one or more non-repudiable deposits to said account, wherein said unique identifier is registered by a plurality of registrars, each associated with a different payment network in said network of payment networks;

said computer-implemented method further comprising using at least one directory for associating the account holder with the unique identifier: wherein the directory functions as a root directory for real-time synchronizing content with other directories containing a plurality of unique identifiers associated with a plurality of accounts residing at a plurality of financial institutions.

2. The computer-implemented method of claim 1, wherein the directory associates the account holder with the financial institution.

3. The computer-implemented method of claim 1, wherein the directory is in communication with and operable to be queried by a portal system to make deposits directly to the account associated with said unique identifier.

4. The computer-implemented method of claim 3, wherein the directory is in communication with and operable to be queried by a portal system to withdraw funds from a depositor's account and deposit the funds directly into the account associated with said unique identifier.

5. The computer-implemented method of claim 1, wherein the directory is maintained by a credit or debit card provider.

6. The computer-implemented method of claim 1, wherein the account is linked to a standard financial account.

7. The computer-implemented method of claim 6, wherein funds are transferred automatically in real-time from the account to the standard financial account.

8. The computer-implemented method of claim 1, wherein the financial institution is a credit or debit card provider.

9. The computer-implemented method of claim 1, wherein funds are deposited into the account from a merchant or service provider that accepts payment with a credit or debit card.

10. The computer-implemented method of claim 1, wherein said Internet portal is associated with said financial institution.

11. The computer-implemented method of claim 1, wherein said Internet portal is available to a portable computing device.

12. The computer-implemented method of claim 11, wherein said portable computing device comprises a mobile telephone.

13. The computer-implemented method of claim 1, further comprising aggregating said registrations by said plurality of registrars.

* * * * *